UNITED STATES PATENT OFFICE.

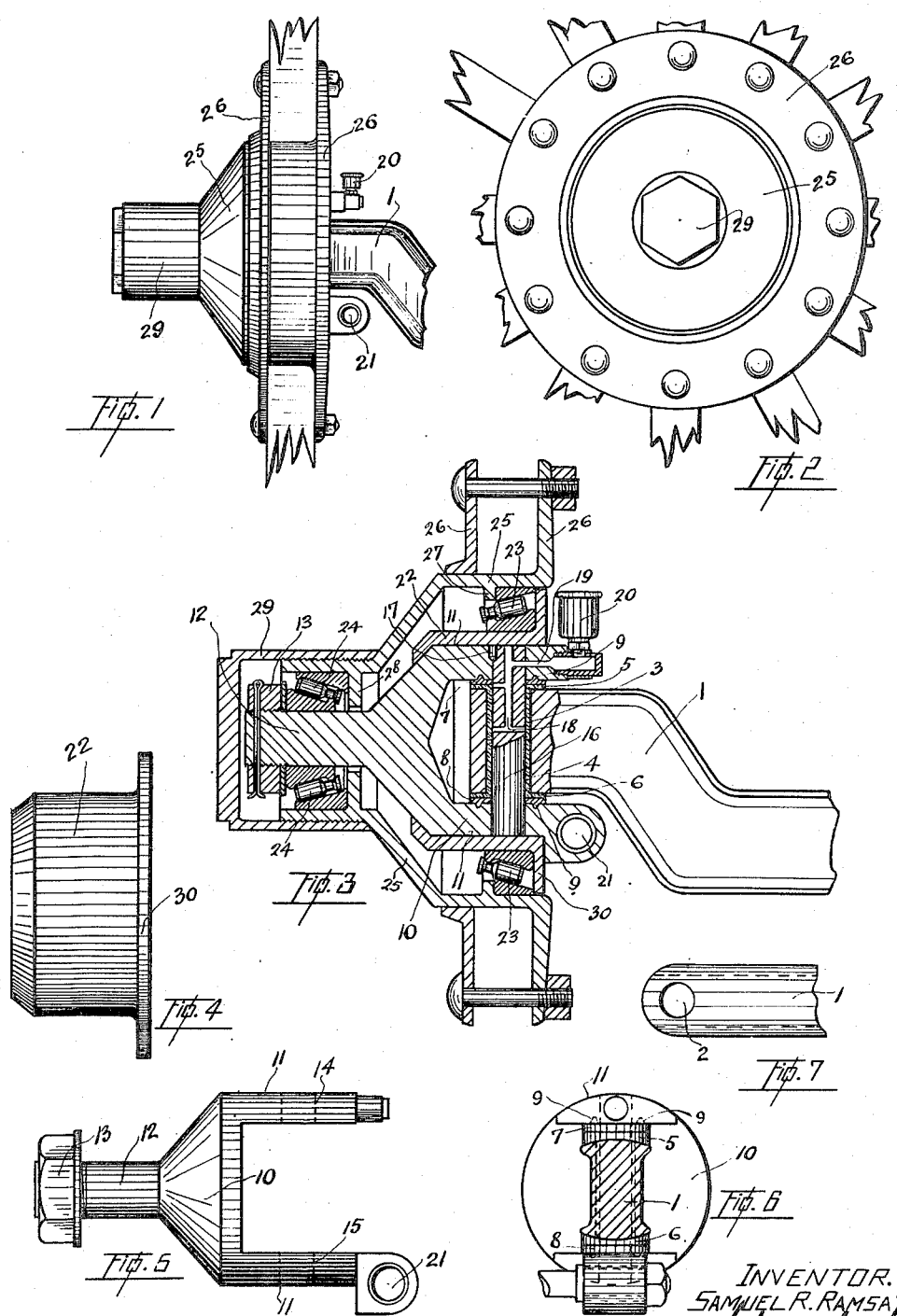

SAMUEL R. RAMSAY, OF NEW WESTMINSTER, BRITISH COLUMBIA, CANADA, ASSIGNOR OF ONE-EIGHTH TO LEONARD WILSON, OF NEW WESTMINSTER, BRITISH COLUMBIA, CANADA.

AUTOMOBILE FRONT AXLE.

1,226,809.  Specification of Letters Patent.  Patented May 22, 1917.

Application filed July 28, 1916. Serial No. 111,903.

*To all whom it may concern:*

Be it known that I, SAMUEL R. RAMSAY, a citizen of the United States, and a resident of the city of New Westminster, in the province of British Columbia, Canada, have invented certain new and useful Improvements in Automobile Front Axles, of which the following is a specification.

My invention relates to improvements in automobile front axles, and the object of my invention is to provide an axle in which the steering wheel is pivotally mounted in such a manner that the axis about which the wheel turns is in the plane of the wheel center and in which the load is centrally distributed on the pivot. A further object is to devise an axle in which the connection of the steering wheel thereto has the number of parts reduced to the minimum and of the simplest construction, thereby providing for the maximum facility in assembling and disassembling, and at the same time considerably reducing the cost of construction, thus providing an axle which is simple, practical, inexpensive, and highly efficient.

I attain these objects by the construction illustrated in the accompanying drawings in which—

Figure 1 is a front view of an end portion of a front axle and the hub of a steering wheel embodying my invention.

Fig. 2 is a side view of Fig. 1, looking on the hub cap.

Fig. 3 is a sectional view, taken on the longitudinal center line of Fig. 1.

Fig. 4 is a detail view of the sleeve.

Fig. 5 is a detail view of the yoke, in side elevation.

Fig. 6 is an end view of the yoke assembled on the axle, the axle being shown in section.

Fig. 7 is a plan view of the end of the axle.

Similar figures of reference indicate similar parts throughout the several views.

1 indicates the axle the cross section of which, as shown in Fig. 6, is similar to that of automobile axles in common use at the present time, although it may be of any other form. The end of the axle is preferably rounded and provided with a vertical opening 2, as shown in Fig. 7, the center of which opening lies in the plane of the wheel center and coincides with the vertical axis about which it turns, and into which opening, from the opposite ends thereof, are fitted the bushings 3 and 4, which bushings are provided with flanges 5 and 6 respectively, and which flanges bear respectively on the upper and lower sides of the axle when the bushings are in place. These bushings are preferably of brass, Babbitt metal, or the like, and mounted on the flanges 5 and 6 are steel disks or washers 7 and 8, which disks are provided on their outer faces with projections 9 adapted to fit suitable depressions formed in the yoke hereinafter mentioned so that they, the disks 7 and 8, will turn with the yoke when same is actuated, as hereinafter described. The bores of the disks, when assembled, are concentric with the bores of the bushings 3 and 4, and the disks, it may be here stated, are provided for the purpose of taking the wear which would otherwise come directly on the yoke.

Mounted on the axle 1, in the manner shown in Fig. 3, is a yoke member 10, formed generally as shown in Figs. 3, 5 and 6, and having a substantially horizontal bearing surface 11 and an extension 12, which extension is threaded at its outer end to receive a nut 13. Openings 14 and 15, indicated dotted in Fig. 5, are provided in each leg of the yoke, and these openings are concentric with each other and with the bores of the washers 7 and 8 and bushings 3 and 4. A pivot pin 16 connects the yoke to the axle, the pin being rotatably mounted in the bushings 3 and 4 and having its ends fitting the openings 14 and 15 and being rigidly secured to the yoke by means of the dowel pin 17. Provision is made for lubricating the bushings 3 and 4 by means of a suitable channel 18 in the pin, which channel is in connection with a channel 19 formed in the upper leg of the yoke and adapted to be fed by a suitable lubricator 20, as shown in Figs. 1 and 3. 21 indicates an eye formed on the yoke, as shown, which eye receives the steering rod.

A sleeve 22 provided with a flange 30 is mounted on the horizontal bearing surface 11 of the yoke 10, being fitted tightly thereon, and on this sleeve is fitted the roller bearing 23, the rollers of which are in the plane of the wheel and also of the pin 16, a similar roller bearing 24 being fitted on the extension 12 of the yoke, as shown in Fig. 3. These roller bearings may be of any suitable type, such as the Timken roller bearings shown, and which are well known to those skilled in the art, necessitating no further description, and mounted on them is the wheel hub 25, the hub flanges being indicated by the numerals 26. The hub is provided with internal flanges 27 and 28, which serve to maintain the respective roller bearings in place, that is to say, the roller bearing 23 fits between flange 30 of sleeve 22 and flange 27, and roller bearing 24 between flange 28 and nut 13 threaded on to the extension 12 of the yoke. The flange 28 also serves to maintain the hub in position, bearing as it does against the roller bearing 24. 29 indicates a hub cap threaded on to the outer end of the hub and inclosing the nut 13 and roller bearing 24.

From the foregoing description the operation of the device will be clearly understood, as it will be apparent, on reference being made to Fig. 3, that, as the pivot 16 is secured into the yoke 10 and rotatable in the bushings 3 and 4, the yoke will swing in either direction when actuated by the steering rod connected to the eye 21, and thus the wheel will be moved laterally to the right or left according to the direction in which the steering rod is actuated. The facility with which the parts may be assembled or disassembled will be obvious, as by the removal of the cap 29 and nut 13 the wheel may be immediately and quickly removed, its replacement being accomplished as easily and quickly. Again, should it be desired to disconnect the entire device from the axle, all that is necessary is to remove the wheel as stated, drive back the sleeve 22, exposing the pivot 16, which may then be easily driven out of the yoke 10.

It will thus be seen that I have devised a front axle for automobiles in which the wheel is pivotally mounted to turn about an axis in the plane of its center and in which the load is centrally distributed on the pivot, and which axle is of the simplest construction, capable of being quickly and easily assembled or disassembled, and which is practical, inexpensive and highly efficient.

What I claim as my invention is:

The combination with an axle having a vertical opening near its outer end, of a yoke member mounted on said axle to turn about a vertical axis, said yoke having openings at diametrically opposite points concentric with the axle opening and with the axis about which it turns, a plain pin disposed in said openings, said pin being fixed in the yoke openings and rotatable in the axle opening, and a tight fitting sleeve mounted on the periphery of the said yoke member and frictionally held thereon, said sleeve extending the entire length of the peripheral portion of the yoke member and being flared outwardly at its inner end to form a flange and flared inwardly at its outer end to bear on the end of the yoke member.

Dated at Vancouver, B. C., this 17th day of July, 1916.

SAMUEL R. RAMSAY.